(12) United States Patent
Yuen et al.

(10) Patent No.: US 10,868,848 B2
(45) Date of Patent: Dec. 15, 2020

(54) WIRELESS MULTIMEDIA COMMUNICATIONS SYSTEM AND METHOD

(71) Applicant: PERASO TECHNOLOGIES INC., Toronto (CA)

(72) Inventors: Derek Yuen, Richmond Hill (CA); Bradley Robert Lynch, Toronto (CA)

(73) Assignee: PERASO TECHNOLOGIES INC., Toronto (CA)

( * ) Notice: Subject to any disclaimer, the term of this patent is extended or adjusted under 35 U.S.C. 154(b) by 216 days.

(21) Appl. No.: 15/659,089

(22) Filed: Jul. 25, 2017

(65) Prior Publication Data

US 2018/0027041 A1    Jan. 25, 2018

Related U.S. Application Data

(60) Provisional application No. 62/366,301, filed on Jul. 25, 2016, provisional application No. 62/366,335, filed on Jul. 25, 2016.

(51) Int. Cl.
| | |
|---|---|
| *G06F 15/16* | (2006.01) |
| *H04L 29/06* | (2006.01) |
| *H04L 5/00* | (2006.01) |
| *H04L 12/26* | (2006.01) |

(52) U.S. Cl.
CPC .......... *H04L 65/602* (2013.01); *H04L 5/006* (2013.01); *H04L 43/16* (2013.01); *H04L 65/80* (2013.01); *H04L 67/38* (2013.01); *H04L 69/04* (2013.01)

(58) Field of Classification Search
CPC ..... G06F 3/012; G06T 15/205; G06T 19/006; G06T 3/4092; H04L 67/38
See application file for complete search history.

(56) References Cited

U.S. PATENT DOCUMENTS

| | | | |
|---|---|---|---|
| 9,721,393 B1* | 8/2017 | Dunn | G06T 19/006 |
| 2008/0068446 A1* | 3/2008 | Barkley | H04N 7/147 |
| | | | 348/14.07 |
| 2013/0263083 A1* | 10/2013 | Reddy | G06F 9/45504 |
| | | | 717/106 |
| 2015/0156635 A1* | 6/2015 | Liang | H04W 16/14 |
| | | | 370/328 |
| 2015/0235474 A1* | 8/2015 | Mullins | G06T 19/006 |
| | | | 345/419 |
| 2016/0277466 A1* | 9/2016 | Lohmar | H04L 65/4084 |
| 2018/0091577 A1* | 3/2018 | Park | H04N 21/236 |
| 2018/0169517 A1* | 6/2018 | Balest | A63F 13/26 |

* cited by examiner

*Primary Examiner* — Brian Whipple
*Assistant Examiner* — Gregory P Tolchinsky
(74) *Attorney, Agent, or Firm* — Perry + Currier (57) ABSTRACT

A host computing device for a multimedia system includes: a processor configured to generate multimedia data for transmission to a client device; a compression/decompression device connected to the processor, the compression/decompression device configured to receive the multimedia data and generated compressed multimedia data; a communications assembly connected to the processor and including (i) a wireless transceiver and (ii) a controller configured to receive the multimedia data from the processor and the compressed multimedia data from the compression/decompression device; the controller further configured to select one of the multimedia data and the compressed multimedia data for transmission to the client device via the wireless transceiver.

16 Claims, 5 Drawing Sheets

WIRELESS MULTIMEDIA COMMUNICATIONS SYSTEM AND METHOD

CROSS-REFERENCE TO RELATED APPLICATIONS

This application claims priority from U.S. provisional patent application Nos. 62/366,301 and 62/366,335, both filed Jul. 25, 2016. The contents of each of the above applications is incorporated herein by reference.

FIELD

The specification relates generally to wireless communications, and specifically to a wireless multimedia communications system with mobile client devices served by a stationary host device.

BACKGROUND

Media streaming systems, such as virtual reality systems in which a user wears a headset or other device displaying video, may rely on a distinct host device such as a game console to generate the video and stream the video to the headset. In order to provide the bandwidth required to carry the above-mentioned vide, such systems may compromise the mobility of the headset. Alternatively, or in addition, such systems may reduce the available bandwidth in order to provide greater mobility to the headset.

SUMMARY

An aspect of the specification provides a host computing device for a multimedia system, including: a processor configured to generate multimedia data for transmission to a client device; a compression/decompression device connected to the processor, the compression/decompression device configured to receive the multimedia data and generated compressed multimedia data; a communications assembly connected to the processor and including (i) a wireless transceiver and (ii) a controller configured to receive the multimedia data from the processor and the compressed multimedia data from the compression/decompression device; the controller further configured to select one of the multimedia data and the compressed multimedia data for transmission to the client device via the wireless transceiver.

BRIEF DESCRIPTIONS OF THE DRAWINGS

Embodiments are described with reference to the following figures, in which.

DETAILED DESCRIPTION

Figure 1:
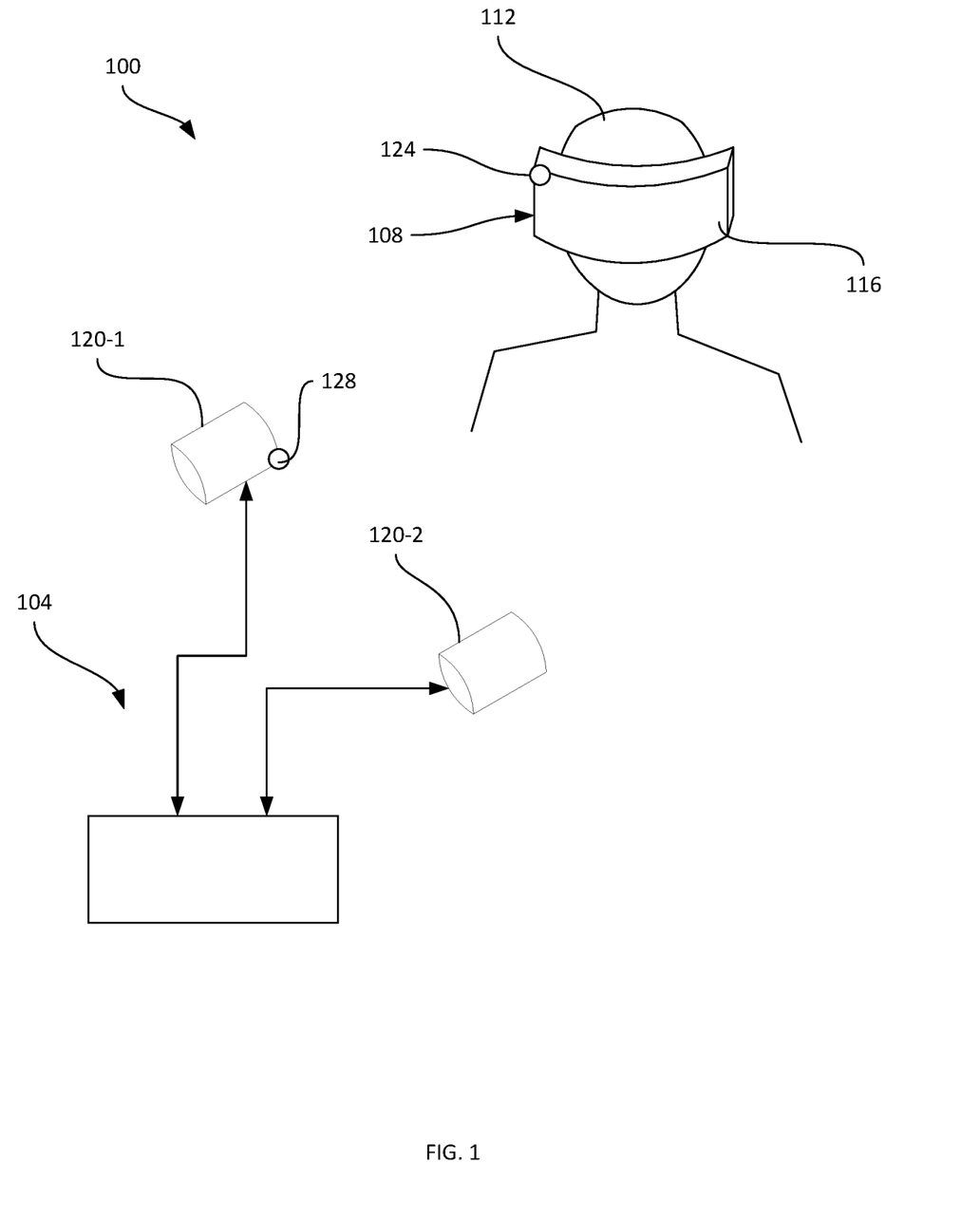
FIG. 1 depicts a wireless multimedia communications system.

FIG. 1 depicts a wireless multimedia communication system 100 including a host computing device 104 and a client computing device 108. The client computing device 108 is movably mounted. In the present example, the client computing device includes a head-mounted unit supported by a headband or other mount that is wearable by an operator 112. In other words, the client device 108 is moveably mounted as a result of being mounted on the operator 112, who is free to move relative to the host device 104. The client device 108, in general, receives multimedia data from the host device 104 and presents the multimedia data to the operator 112 via output devices such as a display, one or more speakers, and the like.

The host device 104 is typically, although not necessarily, stationary. The host device 104, as will be discussed in greater detail below, generates multimedia data for wireless transmission to the client device 108 (and presentation to the operator 112). The nature of the multimedia data is not particularly limited; for example, the multimedia data can include static video and audio, in addition to or instead of dynamically generated video and audio data, also referred to as virtual reality multimedia data. The host device 104 can therefore be implemented as any suitable computing device, including a desktop computer, laptop computer, gaming console, and the like.

In the present example, the client device 108 is a virtual reality (VR) headset. The client device 108 thus includes a housing 116 supporting the other components of the client device 108, as discussed below. The housing 116, in turn, is supported on the operator 112 by way of a headband or other mounting structure. The client device 108 can be implemented as a dedicated VR headset, in which the components of the client device 108 are integrally supported within the housing 116. In other examples, the client device 108 is implemented as a holder for a smart phone or other portable computing device, which provides at least some of the above-mentioned output devices (e.g. the display) and may also provide certain data processing functions. The housing 116, in such examples, is configured to removably support such a portable computing device, and also to integrally support certain other components, such as wireless transceivers, to be discussed below. The housing 116, in such examples, also includes one or more connectors for electrically connecting the components internal to the housing 116 with the portable computing device.

The generation of VR multimedia data by the host device 104 for transmission to the client device 108 typically includes obtaining positional data for the client device. The host device 104 therefore includes, in the present example, at least one tracking device 120. In the illustrated example, the host device 104 includes a pair of tracking devices 120-1 and 120-2, such as depth cameras (e.g. including infrared (IR) projectors and IR cameras), configured to determine the position of the client device 108, the operator 112, or both, relative to the tracking devices 120. The host device 104 is configured to receive positional data from the tracking devices 120 (or to receive image or depth data from the tracking devices 120 and determine positional data) and to dynamically generate VR multimedia data based on the positional data. Typically, the positional data is updated periodically (e.g. at a rate of thirty times per second), and the generation of VR data is implemented with the most recently obtained positional data. Thus, each of a plurality of video frames and accompanying audio data generated by the host device 104, for example, may be generated based on a newly obtained position of the operator 112, client device 108, or both.

Having generated the VR data, the host device 104 is configured to transmit the VR data to the client device 108.

More specifically, in the present example, in which the VR data is video data, the VR data is streamed to the client device 108 simultaneously with the generation of further VR data. The VR data is transmitted from the host device 104 to the client device 108 wirelessly. For example, the host device 104 and the client device 108 may establish a wireless connection with each other based on any suitable wireless standard, such as the IEEE 802.11ad (WiGig) standard or enhancements thereof (e.g. 802.11 ay). To that end, each of the client device 108 and the host device 104 include at least one wireless transceiver.

In the illustrated example, the client device includes at least one wireless transceiver 124. The transceiver 124 is supported by the housing 116 and connected to internal processing components (not shown) of the client device 108 by any suitable set of electrical connections (e.g. data buses or the like, not shown). The host device 104 in the present example also includes a wireless transceiver 128. In other examples, each of the host device 104 and the client device 108 can include a plurality of wireless transceivers; the client device 108 and the host device 104 need not include the same number of wireless transceivers as one another.

In the example shown in FIG. 1, the transceiver 128 is placed on one of the tracking devices 120, which may in turn be supported on a stand, wall-mount or other mounting structure (not shown). Specifically, the transceiver 128 is supported by the tracking device 120-1 in the illustrated example. In other examples, the transceiver 128 is supported by the tracking device 120-2. In further examples, the transceiver 128 is not supported by one the tracking devices 120, but is rather supported on a housing of the host device 104 or any other suitable support structure (e.g. a mast extending from the host device 104 housing and distinct from the support structure for the tracking devices 120).

As will be discussed in greater detail below, each of the host device 104 and the client device 108 are configured to control their respective transceivers 124 and 128 to enable the continued exchange of multimedia data between devices in response to changes in wireless link quality conditions. Such changes may be caused by the movement of the client device 108 relative to the host device 104, by the presence of one or more additional client devices (not shown), and the like. Before discussing the functionality of the host device 104 and the client device 108, certain internal components of the host device 104 and the client device 108 will be discussed with reference to FIG. 2.

Figure 2:
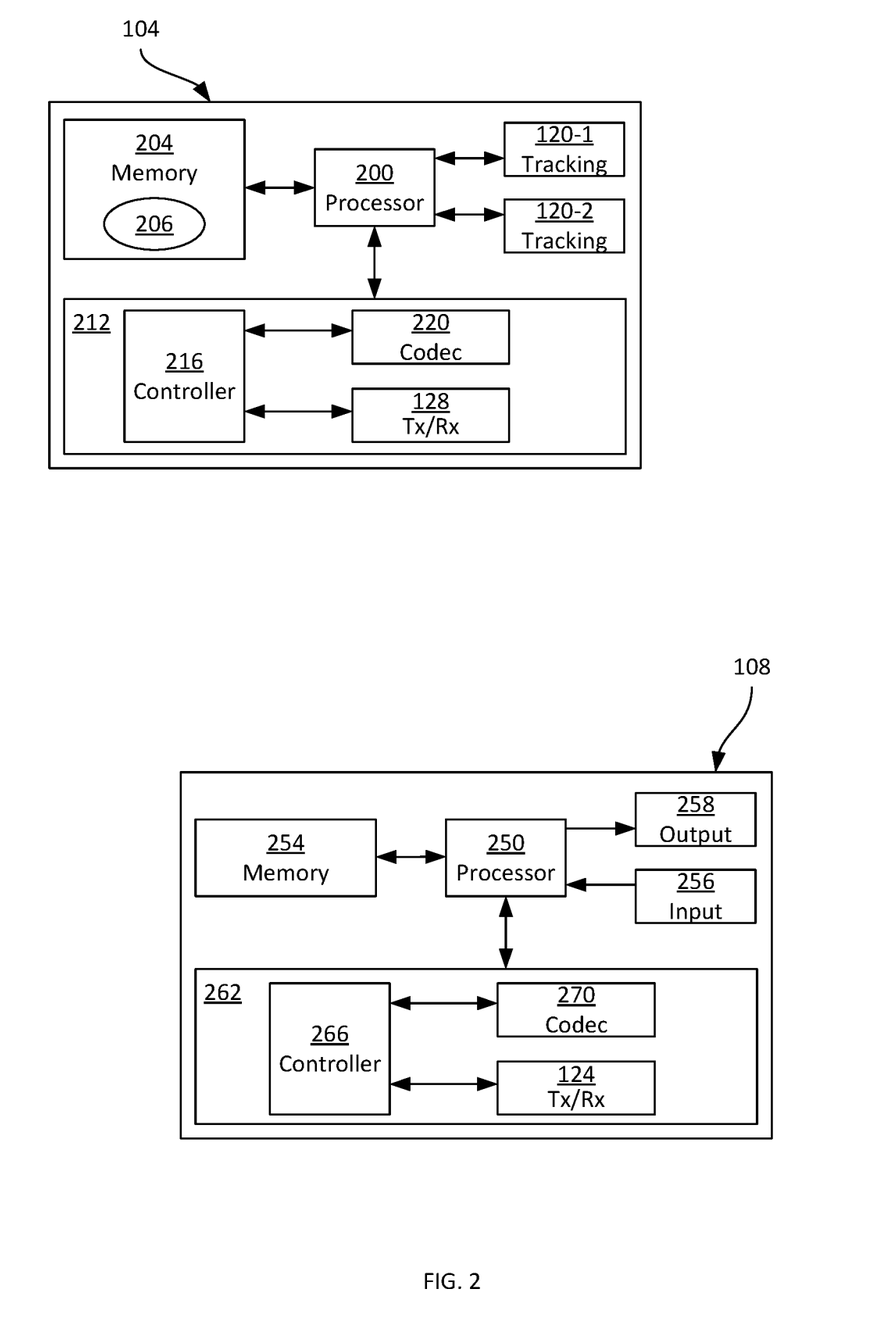
FIG. 2 depicts certain internal components of the client and host devices of the system of FIG. 1.

Turning to FIG. 2, certain components of each of the host device 104 and the client device 108 are illustrated. The host device 104 includes a central processing unit (CPU), also referred to as a processor 200. The processor 200 is interconnected with a non-transitory computer readable storage medium, such as a memory 204, having stored thereon various computer readable instructions in the form of an application 206 for execution by the processor 200 to configure the host device 104 to perform various functions (e.g. generating and streaming multimedia data to the client device 108). The memory 204 includes a suitable combination of volatile (e.g. Random Access Memory or RAM) and non-volatile memory (e.g. read only memory or ROM, Electrically Erasable Programmable Read Only Memory or EEPROM, flash memory). The processor 200 and the memory 204 each comprise one or more integrated circuits (ICs).

The host device 104 may also include one or more input devices (e.g. a keyboard, mouse, game controller or the like, not shown), and one or more output devices (e.g. a display, speaker and the like, not shown). Such input and output devices serve to receive commands for controlling the operation of the host device 104 and for presenting information, e.g. to a user of the host device 104. The host device 104 also includes, as noted in connection with FIG. 1, the tracking devices 120-1 and 120-2 connected to the processor 200 for providing positional data to the processor 200.

The host device 104 further includes a wireless communications assembly 212 interconnected with the processor 200. The communications assembly 212 enables the host device 104 to communicate with other computing devices, including the client device 108. In the present example, as noted above, the assembly 212 enables such communication according to the IEEE 802.11ad standard, and thus transmits and receives data at frequencies of around 60 GHz.

The communications assembly 212 includes a controller 216 in the form of one or more integrated circuits, configured to establish and maintain communications links with other devices. The controller 216 is also configured to process outgoing data for transmission via the above-mentioned transceiver 128. As will now be apparent, the transceiver 128 includes a transceiver circuit (e.g. an integrated circuit or any other suitable hardware element) connected to a steerable antenna array (e.g. a phased array of antenna elements). The controller 216 is further configured to receive transmissions from the transceiver 128 and process the transmissions for communication to the processor 200. The controller 216, in the present example, includes a baseband processor, which may be implemented as one or more integrated circuits preprogrammed to perform the functions discussed herein, or having stored thereon executable instructions that configured to controller 216 to perform those functions.

The host device 104 also includes a compression/decompression device (also referred to as a codec device) 220. In the present example, the codec 220 is a component of the communications assembly 212. For example, the codec 220 may be implemented as a component of the controller 216, or as one or more discrete circuits (e.g. a discrete IC connected to the controller 216). The controller 216 is configured, in the illustrated example, to receive multimedia data from the processor 200, for example as a series of uncompressed video frames. The controller 216 is configured to pass each video frame to the codec 220, which is in turn configured to generate a compressed version of the video frame. As will be discussed below in greater detail, the controller 216 is configured to select one of the compressed video frame and the uncompressed video frame for transmission to the client device 108.

In other examples, the codec 220 need not implemented as a component of the communications assembly 212. For example, the codec 220 may be connected between the processor 200 and the communications assembly 212. In such examples, the processor 200 is configured to provide uncompressed video frames (or other suitable multimedia data) to both the controller 216 and the codec 220 substantially simultaneously. As noted above, the controller 216 is then configured to select one of an uncompressed video frame received from the processor 200 and a compressed video frame received from the codec 220.

As will now be apparent, the codec 220 is also configured to decompress received data received at the communications assembly 212 from the client device 108. For example, the controller 216 is configured to detect an indication (e.g., in a header) in data received from the transceiver 128 that data is compressed. Responsive to such a detection, the controller 216 is configured to transmit the data to the codec 220, which is in turn configured to decompress the data. The codec 220 is then configured to return the decompressed data to the controller 216. In other examples, the codec 220 is configured to pass the decoded data directly to the processor 200 rather than to the controller 216.

The client device 108 includes a central processing unit (CPU), also referred to as a processor 250. The processor 250 is interconnected with a non-transitory computer readable storage medium, such as a memory 254, having stored thereon various computer readable instructions for execution by the processor 250 to configure the client device 108 to perform various functions (e.g. receiving and rendering multimedia data from the host device 104). The memory 254 includes a suitable combination of volatile (e.g. Random Access Memory or RAM) and non-volatile memory (e.g. read only memory or ROM, Electrically Erasable Programmable Read Only Memory or EEPROM, flash memory). The processor 250 and the memory 254 each comprise one or more integrated circuits.

The client device 108 may also include one or more input devices 256 (e.g. an eye-tracking device, microphone or the like), and one or more output devices 258 (e.g. a display, speaker or the like). The input devices 256 serve to receive commands for controlling the operation of the client device 108, as well as commands for relaying to the host device 104 to control certain aspects of the operation of the host device 104. The output devices 258 serve to present information, including the multimedia data received from the host device 104, to the operator 112.

The client device 108 further includes a wireless communications assembly 262 interconnected with the processor 250. The communications assembly 262 enables the client device 108 to communicate with other computing devices, including the host device 104. In the present example, as noted above, the assembly 262 enables such communication according to the IEEE 802.11ad standard, and thus transmits and receives data at frequencies of around 60 GHz.

The communications assembly 262 includes a controller 266 in the form of one or more integrated circuits, configured to establish and maintain communications links with other devices. The controller 266 is also configured to process outgoing data for transmission via the above-mentioned transceiver 124. As will now be apparent, the transceiver 124 includes a transceiver circuit (e.g. an integrated circuit or any other suitable hardware element) connected to a steerable antenna array (e.g. a phased array of antenna elements). The controller 266 is further configured to receive transmissions from the transceiver 124 and process the transmissions for communication to the processor 250. The controller 266, in the present example, includes a baseband processor, which may be implemented as one or more integrated circuits preprogrammed to perform the functions discussed herein, or having stored thereon executable instructions that configured to controller 266 to perform those functions.

The client device 108 also includes a codec device 270. In the present example, the codec 270 is a component of the communications assembly 262. For example, the codec 270 may be implemented as a component of the controller 266, or as one or more discrete circuits (e.g. a discrete IC connected to the controller 266). The codec 270 is configured to generate compressed versions of data generated by the processor 250, and to decompress data received from the host device 104, substantially as discussed above in connection with the codec 220 of the host device 104.

Figure 3:
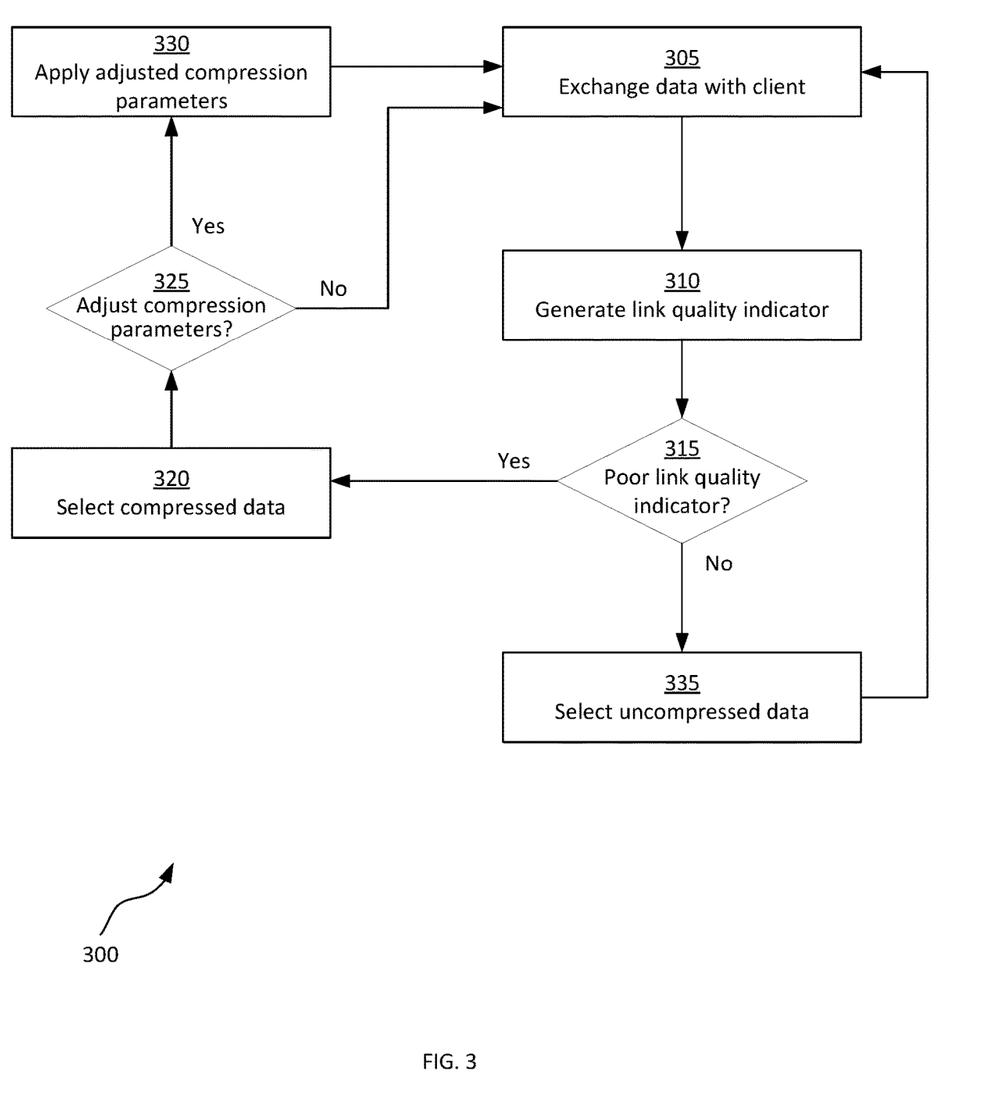
FIG. 3 depicts a method of wireless exchange of multimedia data.

Turning now to FIG. 3, the operation of the system 100, and particularly of the host device 104, will be described in greater detail. FIG. 3 illustrates a method 300 of wireless exchange of multimedia data. The method 300 will be described in conjunction with its performance on the system 100. In particular, the method 300 is performed by the host device 104. Specifically, in the present example the blocks of the method 300 are performed by the controller 216 of the host device 104.

At block, the host device 104 is configured to exchange data with the client device 108. In order to conduct the exchange of data, as will now be apparent, the host device 104 and the client device 108 are configured (e.g. prior to the initiation of the method 300) to establish a connection between the transceivers 124 and 128. Such a connection may be established in any of a variety of manners. For example, the host device 104 can be configured to periodically broadcast an identifier (e.g. an SSID) of the host device 104 or a local-area network hosted by the host device 104. The client device 108 may initiate communications with the host device 104 by sending a request to the host device 104 including the above-mentioned identifier (as well as an identifier of the client device 108 itself).

Figure 4:
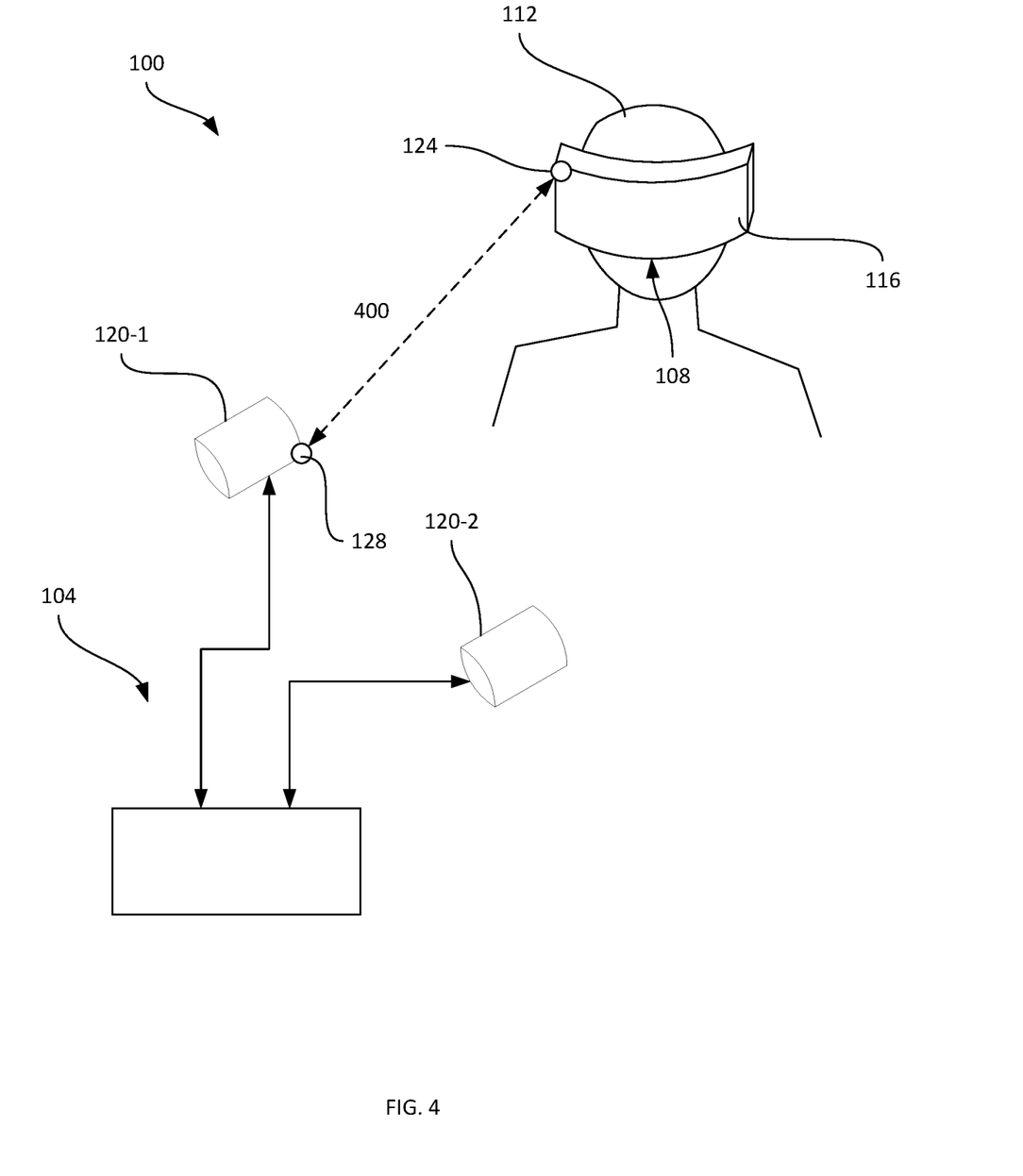
FIG. 4 depicts the system of FIG. 1 with a connection established between a host device and a client device.

Referring briefly to FIG. 4, a connection 400 is shown having been established between the host device 104 and the client device 108. As will be apparent, the establishment of the connection can also include a suitable beamforming procedure when the antennas deployed with the transceivers 124 and 128 are steerable arrays. In the present example, as noted above, the host device 104 is configured to generate VR multimedia data for presentation to the operator 112 by the client device 108. The exchange of data at block 305 includes, therefore, the generation of multimedia data by the processor 200 (e.g. based on positioning data received from the tracking devices 120) and the transmission of such data to the client device 108 via the communications assembly 212. The host device 104 may also receive additional positioning data (e.g. eye tracking data) from the client device 108 itself at block 305, which may inform the generation of subsequent multimedia data.

At block 310, the controller 216 is configured to generate a link quality indicator. The link quality indicator indicates the capacity of the connection 400 to carry the data being exchanged at block 305. As will be apparent, the host device 104 may serve data to a plurality of client devices 108 via a corresponding plurality of connections. More generally, therefore, the link quality indicator indicates the capacity of each of the above-mentioned connections to carry the data being exchanged with the corresponding client devices. The controller 216 may also be configured to generate a single link quality indicator regardless of the number of client devices being served.

The link quality indicator generated at block 310 can include a measurement of one or more performance attributes. For example, the controller 216 can be configured to continuously monitor one or more performance attributes of the transceiver 128. Examples of the performance attributes include a received signal strength indicator (RSSI) and a signal-to-noise ratio (SNR) generated from signals received at the transceiver 128 from the client device 108. The link quality indicator generated at block 310 can include each of the above-mentioned measurements, or a score or other parameter generated from such measurements.

The link quality indicator can also include one or more measured performance attributes received at the host device 104 from the client device 108. Such attributes can include one or both of RSSI and SNR measurements generated at the client device 108 from signals detected at the transceiver 124 and originating at the transceiver 128. As noted above, the performance attributes received from the client device 108 can be distinct components of the link quality indicator, or the controller 216 can be configured to aggregate client-derived performance attributes with host-derived performance attributes.

Figure 5:
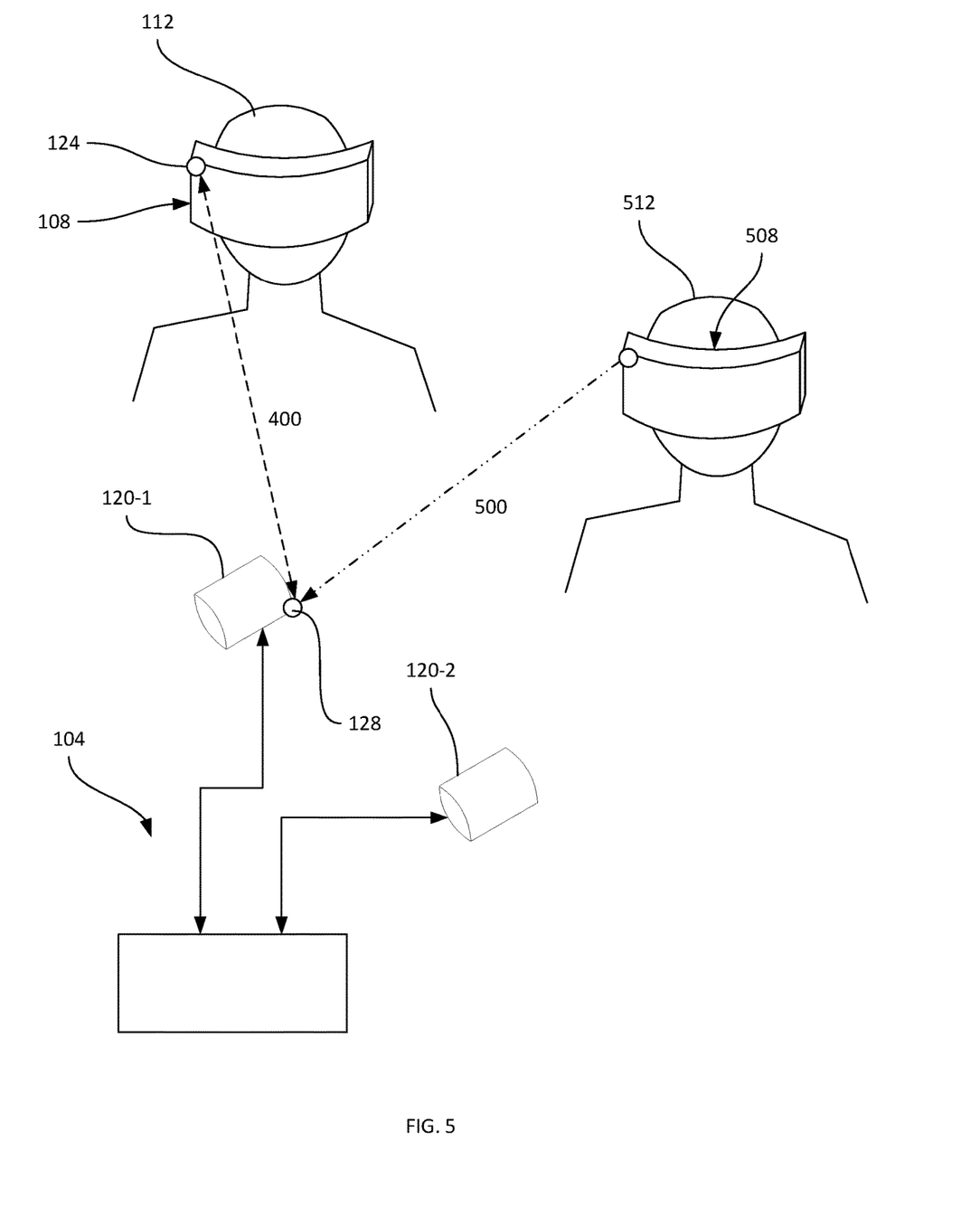
FIG. 5 depicts the system of FIG. 1 with a connection established between the host device and a second client device.

The link quality indicator can further include a number of client devices 108 currently receiving multimedia data from the host device 104. For example, FIG. 5 illustrates a second connection 500 established between the host device 104 and a second client device 508 worn by a second operator 512. As will now be apparent, the delivery of multimedia data to both client devices 108 and 508 may negatively impact the available capacity of one or both of the connections 400 and 500. The client count may be a distinct component of the link quality indicator, or may be aggregated with the above-mentioned performance attributes. When the link quality indicator is an aggregation of a plurality of parameters, the parameters may be weighted. For example, the number of client devices connected to the host device 104 may be allocated a greater weight than the measured RSSI at the transceiver 128.

Returning to FIG. 3, at block 315 the controller 216 is configured to determine whether the link quality indicator generated at block 310 indicates poor link quality for the connection 400 (or for any other connection or set of connections established with client devices by the communications assembly 212). The determination at block 315 includes a comparison of the link quality indicator to a lower link quality threshold. The threshold, depending on the form of the link quality indicator itself, may be a single threshold corresponding to the above-mentioned aggregate link quality indicator, or a set of thresholds each corresponding to one of the discrete components of the link quality indicator. For example, the lower link quality threshold may include a client count threshold and an SNR threshold. When the number of connected client devices is greater than the client count threshold, or when the measured SNR is lower than the SNR threshold, the link quality indicator does not satisfy the lower link quality threshold. In some examples, when a plurality of thresholds are assess at block 315, the controller 216 may be configured to rank the thresholds. For example, the controller 216 may be configured to first compare the number of connected client devices to the client count threshold. If the number of connected client devices exceeds the client count threshold (i.e. fails to satisfy the lower link quality threshold), the controller 216 may be configured to proceed directly to block 320, without assessing any remaining components of the link quality indicator.

When the determination at block 315 is affirmative (that is, when the link quality indicator fails to meet the lower link quality threshold) the performance of the method 300 proceeds to block 320. At block 320, the controller 216 is configured to select the compressed multimedia data generated by the codec 220 for transmission to the client device 108. For example, when each instance of the method 300 results in the transmission of one frame of video data at block 305, as a result of the selection at block 320, the next frame of video data sent to the client device 108 is a compressed frame. The selection of compressed data at block 320 is achieved by the controller 216, for example, by retrieving the compressed frame generated by the codec 220 (as noted above, the codec 220 generates a compressed version of each frame of video data, whether the compressed frame is used by the controller 216 or not). The compressed frame may be retrieved from a buffer in the codec 220 itself, or may have already been received and stored at the controller 216.

Prior to sending the compressed frame to the client device 108 via the transceiver 128, the controller 216 is configured to determine whether to adjust one or more parameters at the codec 220 to determine the degree of compression applied to the multimedia data. As will now be apparent, the codec 220 may apply any of a number of compression processes, and may also apply such processes to achieve varying degrees of compression. For example, the controller 216 may apply a compression parameter to the codec 220, such as a target bitrate. The controller 216 is configured, in some examples, to store a preconfigured mapping between codec parameters and link quality indicators. For example, for each of a plurality of numbers of client devices, the controller 216 may store a corresponding compression parameter. Thus, for greater numbers of client devices, the controller 216 may store lower bitrates causing the codec 220 to apply more aggressive compression to subsequent video frames.

The controller 216 may also store, or retrieve from the codec 220, the currently active compression parameters. Thus, at block 325, if the currently active compression parameters do not match those specified by the above-mentioned mapping for the link quality indicator generated at block 310, the determination at block 325 is affirmative. When the determination at block 325 is affirmative, the compression parameter(s) specified by the mapping are passed to the codec 220 at block 330 for use in compressing subsequent multimedia data (although not the multimedia data to be sent following its selection at the current performance of block 320). Following the performance of block 330, the controller 216 returns to block 305, at which point the data selected at block 320 is transmitted to the client device 108. In other examples, blocks 325 and 330 can be omitted (that is, the compression applied by the codec 220 may be static).

Returning to block 315, when the determination at block 315 is negative (i.e., when the link quality indicator generated at block 310 satisfies the lower link quality threshold), the controller proceeds to block 335 rather than to block 320. At block 335 the controller 216 is configured to select the uncompressed multimedia data received from the processor 200 rather than the compressed data generated by the codec 220. The compressed data is typically discarded to release memory for the generation and storage of the next frame of compressed multimedia data. Following As will be apparent, therefore, the host device 104 is configured to assess wireless link conditions, and to dynamically enable or disable the application of compression to multimedia data sent to the client device 108, as well as dynamically adjust the level of compression applied.

The scope of the claims should not be limited by the embodiments set forth in the above examples, but should be given the broadest interpretation consistent with the description as a whole.

The invention claimed is:

1. A host computing device for a multimedia system, comprising:
   a processor configured to generate multimedia data, including a sequence of uncompressed video frames, for transmission to a client device;
   a compression/decompression device connected to the processor, the compression/decompression device configured to:
   store a current set of compression parameters;
   receive an uncompressed video frame of the multimedia data; and
   generate a compressed video frame according to the current set of compression parameters;

a communications assembly connected to the processor and including (i) a wireless transceiver and (ii) a controller configured to receive the uncompressed video frame from the processor and the compressed video frame from the compression/decompression device;

the controller further configured to generate a link quality indicator corresponding to the wireless transceiver;

the controller further configured to select, based on the link quality indicator, one of the uncompressed video frame and the compressed video frame for transmission to the client device via the wireless transceiver;

the controller further configured, responsive to selecting the compressed video frame, to determine based on the link quality indicator whether to update the current set of compression parameters for use at the compression/decompression device to generate a subsequent video frame; and the controller further configured, responsive to selecting the uncompressed video frame, to discard the compressed video frame.

2. The host computing device of claim 1, wherein the communications assembly includes the compression/decompression device; the controller further configured to:
   receive the uncompressed video frame from the processor;
   send the uncompressed video frame to the compression/decompression device; and
   receive the compressed video frame from the compression/decompression device.

3. The host computing device of claim 1, the processor further configured to receive positional data corresponding to the client device, and to generate the multimedia data based on the positional data.

4. The host computing device of claim 1, the controller further configured to select one of the uncompressed video frame and the compressed video frame by:
   selecting the compressed video frame when the link quality indicator fails to satisfy a lower link quality threshold; and
   when the link quality indicator satisfies the lower link quality threshold, selecting the uncompressed video frame.

5. The host computing device of claim 4, the controller further configured to generate the link quality indicator based on a number of client devices connected to the wireless transceiver.

6. The host computing device of claim 4, the controller further configured to generate the link quality indicator based on a performance attribute of the wireless transceiver.

7. The host computing device of claim 6, wherein the performance attribute includes at least one of a received signal strength indicator (RSSI) and a signal-to-noise ratio (SNR) at the wireless transceiver.

8. The host computing device of claim 6, the controller further configured to generate the link quality indicator based on a client performance attribute received from the client device.

9. A method in a host computing device for a multimedia system, comprising:
   at a processor of the host computing device, generating multimedia data, including a sequence of uncompressed video frames, for transmission to a client device;
   at a compression/decompression device connected to the processor:
      storing a current set of compression parameters;
      receiving an uncompressed video frame of the multimedia data; and
      generating a compressed video frame according to the current set of compression parameters;
   at a communications assembly connected to the processor and including (i) a wireless transceiver and (ii) a controller:
      receiving the uncompressed video frame from the processor and the compressed video frame from the compression/decompression device;
      generating a link quality indicator corresponding to the wireless transceiver;
      selecting, based on the link quality indicator, one of the uncompressed video frame and the compressed video frame for transmission to the client device via the wireless transceiver;
      responsive to selecting the compressed video frame, determining based on the link quality indicator whether to update compression parameters for use at the compression/decompression device to generate a subsequent compressed video frame; and
      responsive to selecting the uncompressed video frame, discarding the compressed video frame.

10. The method of claim 9, further comprising, at the controller:
    receiving the uncompressed video frame from the processor;
    sending the uncompressed video frame to the compression/decompression device; and
    receiving the compressed video frame from the compression/decompression device.

11. The method of claim 9, the processor further configured to receive positional data corresponding to the client device, and to generate the multimedia data based on the positional data.

12. The method of claim 9, further comprising, at the controller, selecting one of the uncompressed video frame and the compressed video frame by:
    selecting the compressed video frame when the link quality indicator fails to satisfy a lower link quality threshold; and
    when the link quality indicator satisfies the lower link quality threshold, selecting the uncompressed video frame.

13. The method of claim 12, further comprising, at the controller: generating the link quality indicator based on a number of client devices connected to the wireless transceiver.

14. The method of claim 12, further comprising, at the controller: generating the link quality indicator based on a performance attribute of the wireless transceiver.

15. The method of claim 14, wherein the performance attribute includes at least one of a received signal strength indicator (RSSI) and a signal-to-noise ratio (SNR) at the wireless transceiver.

16. The method of claim 14, further comprising, at the controller: generating the link quality indicator based on a client performance attribute received from the client device.

* * * * *